US006721529B2

(12) United States Patent
Chen et al.

(10) Patent No.: US 6,721,529 B2
(45) Date of Patent: *Apr. 13, 2004

(54) RELEASE AGENT DONOR MEMBER HAVING FLUOROCARBON THERMOPLASTIC RANDOM COPOLYMER OVERCOAT

(75) Inventors: Jiann Hsing Chen, Rochester, NY (US); Joseph A. Pavlisko, Pittsford, NY (US); Robert Arthur Lancaster, Hilton, NY (US); Charles Eugene Hewitt, Rochester, NY (US); Nataly Boulatnikov, Rochester, NY (US)

(73) Assignee: NexPress Solutions LLC, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/960,661

(22) Filed: Sep. 21, 2001

(65) Prior Publication Data

US 2003/0096091 A1 May 22, 2003

(51) Int. Cl.[7] ........................ G03G 15/20; G03G 15/02; B32B 7/02; B32B 27/00; D02G 3/00

(52) U.S. Cl. ........................ 399/313; 399/176; 399/320; 399/333; 428/212; 428/421

(58) Field of Search ................................ 428/212, 375, 428/421; 399/333, 313, 176, 320

(56) References Cited

U.S. PATENT DOCUMENTS 4,659,621 A 4/1987 Finn et al. .................. 428/339
5,366,772 A 11/1994 Badesha et al. ........... 428/35.8
5,582,917 A 12/1996 Chen et al. ................. 428/421
6,067,438 A 5/2000 Chen et al. ................. 399/325
6,075,966 A 6/2000 Davis et al. ................ 399/325
6,190,771 B1 * 2/2001 Chen et al. ................. 428/375
6,355,352 B1 * 3/2002 Chen et al. ................. 428/421

FOREIGN PATENT DOCUMENTS

EP 0 455 470 A2 11/1991 .......... G03G/15/20
EP 0 492 416 A1 7/1992 .......... G03G/15/20

* cited by examiner

*Primary Examiner*—Cynthia H. Kelly
*Assistant Examiner*—Lawrence D Ferguson

(57) ABSTRACT

An improved donor member for applying a toner release agent to a toned receiver comprises a support an intermediate layer disposed on the support, and an outermost layer formed from a cured composition comprising a fluorocarbon thermoplastic random copolymer, a curing agent, a particulate filler containing zinc oxide, and a curable aminosiloxane, wherein the fluorocarbon thermoplastic random copolymer has subunits of:

$$-(CH_2CF_2)x-,\ -(CF_2CF(CF_3)y-,\ \text{and}\ -(CF_2CF_2)z-,$$

and x is from 1 to 40 or 60 to 80 mole percent, y is from 10 to 90 mole percent, z is from 10 to 90 mole percent, and x+y+z equals 100 mole percent. A fuser apparatus for electrostatographic printing comprises a fuser roll and a pressure roll forming a nip, a supply of offset preventing oil contained in a reservoir, and a donor roll for delivering the offset preventing oil to a receiver bearing a toner image, wherein the donor roll has an outermost layer formed from the described cured composition comprising a fluorocarbon thermoplastic random copolymer, a curing agent, particulate zinc oxide, and a curable aminosiloxane.

33 Claims, 2 Drawing Sheets

RELEASE AGENT DONOR MEMBER HAVING FLUOROCARBON THERMOPLASTIC RANDOM COPOLYMER OVERCOAT

CROSS-REFERENCE TO RELATED APPLICATIONS

This application relates to commonly assigned, copending applications Ser. No. 09/609,561, FLUOROCARBON THERMOPLASTIC RANDOM COPOLYMER COMPOSITION; Ser. No. 09/607,731, METHOD OF PREPARING THERMOPLASTIC RANDOM COPOLYMER COMPOSITION CONTAINING ZINC OXIDE AND AMINOSILOXANE; Ser. No. 09/608,290, FUSER MEMBER WITH FLUOROCARBON THERMOPLASTIC COATING; and Ser. No. 607,418, METHOD OF COATING FUSER MEMBER WITH THERMOPLASTIC CONTAINING ZINC OXIDE AND AMINOSILOXANE, all said applications having been filed Jun. 30, 2000.

This application also relates to commonly assigned, simultaneously filed, copending application Ser. No. 09/609,561, PRESSURE MEMBER HAVING FLUOROCARBON THERMOPLASTIC RANDOM COPOLYMER OVERCOAT. The disclosures of all of the aforementioned related applications are incorporated herein by reference.

FIELD OF THE INVENTION

The present invention relates to fuser apparatus for use in electrostatographic printing and, more particularly, to an improved donor member for applying toner release agents to a toned substrate.

BACKGROUND OF THE INVENTION

Heat-softenable toners are widely used in imaging methods such as electrostatography, wherein electrically charged toner is deposited imagewise on a dielectric or photoconductive element bearing an electrostatic latent image. Most often in such methods, the toner is then transferred to a surface of another substrate, for example, a receiver sheet comprising paper or a transparent film, where it is fixed in place to yield the final desired toner image.

Heat-softenable toners comprising, for example, thermoplastic polymeric binders, are generally fixed to the receiver sheet by applying heat to the receiver sheet surface to soften the toner transferred to it, and then allowing or causing the toner to cool.

One such well-known fusing method comprises passing the toner-bearing receiver sheet through the nip formed by a pair of opposing rolls, at least one of which, usually referred to as a fuser roll, is heated and brought into contact with the toner-bearing surface of the receiver sheet in order to heat and soften the toner. The other roll, usually referred to as a pressure roll, serves to press the receiver sheet into contact with the fuser roll. In some other fusing methods, the apparatus is varied so that the fuser roll and/or the pressure roll take the form of a flat plate or belt. The description herein, while generally directed to a generally cylindrical fuser roll in combination with a generally cylindrical pressure roll, is not limited to fusing systems having members with those configurations. For that reason, the more general terms "fuser member" and "pressure member" are preferably employed.

In FIG. 1 is schematically depicted a fuser apparatus 10 that includes a fuser roll 20 and a pressure roll 28 that form a nip 30. A supply of offset preventing oil 33 is provided in an oil reservoir 34. Particulate imaging material 40 disposed on a receiver 42 is fused onto receiver 42 at the nip 30 by the application of heat and pressure. As shown, a heating lamp 44 is connected to a control circuit 46. Alternatively, heat may be provided externally by a heated roll (not shown) riding along the fuser roll 20. The external heating means may supplant or merely assist the heating lamp 44. In some instances, the particulate imaging material 40 may be fixed onto receiver 42 by the application of pressure alone.

FIG. 1 also shows a wicking device 32 in the form of a wick 36, which absorbs the offset preventing oil 33 is contacted by a metering roll 48. Intermediate between fuser roll 20 and intermediate roll 48 is a donor roll 50, which delivers offset preventing oil 33 to the particulate imaging material 40 on receiver 42.

A fuser member usually comprises a rigid support covered with a resilient material, commonly referred to as a "base cushion layer." The resilient base cushion layer and the amount of pressure exerted by the pressure member serve to establish the area of contact of the fuser member with the toner-bearing surface of the receiver sheet as it passes through the nip of the fuser member and pressure members. The size of this area of contact helps to establish the length of time that any given portion of the toner image will be in contact with and heated by the fuser member. The degree of hardness, often referred to as "storage modulus", and the stability thereof, of the base cushion layer are important factors in establishing and maintaining the desired area of contact.

In some previous fusing systems, it has been found advantageous to vary the pressure exerted by the pressure member against the receiver sheet and fuser member. This variation in pressure can be provided, for example in a fusing system having a pressure roll and a fuser roll, by slightly modifying the shape of the pressure roll. The variance of pressure, in the form of a gradient of pressure that changes along the direction through the nip that is parallel to the axes of the rolls, can be established by, for example, continuously varying the overall diameter of the pressure roll along the direction of its axis such that the diameter is smallest at the midpoint of the axis and largest at the ends of the axis, in order to give the pressure roll a sort of "bow tie" or "hourglass" shape. This will cause the pair of rolls to exert more pressure on the receiver sheet in the nip in the areas near the ends of the rolls than in the area about the midpoint of the rolls. This gradient of pressure helps to prevent wrinkles and cockle in the receiver sheet as it passes through the nip. Over time, however, the fuser roll begins to permanently deform to conform to the shape of the pressure roll and the gradient of pressure is reduced or lost, along with its attendant benefits. It has been found that permanent deformation, often referred to as "creep", of the base cushion layer of the fuser member is the greatest contributor to this problem.

Particulate inorganic fillers have been added to base cushion layers to improve mechanical strength and thermal conductivity. High thermal conductivity is advantageous when the fuser roll is heated by an internal heater, enabling the heat to be efficiently and quickly transmitted toward the outer surface of the fuser roll and the toner on the receiver sheet that is intended to be contacted and fused. High thermal conductivity is not so important when the roll is intended to be heated by an external heat source.

Polyfluorocarbon elastomers such as vinylidene fluoride-hexafluoropropylene copolymers are tough, wear resistant, flexible elastomers that have excellent high temperature resistance but relatively high surface energies, which compromises toner release. Fluorocarbon resins such as polytetrafluoroethylene (PTFE) or fluorinated ethylenepropylene (FEP) are fluorocarbon plastics that have excellent release characteristics due to very low surface energy. Fluorocarbon resins are, however, less flexible and elastic than fluorocarbon elastomers and are therefore not suitable alone as the surface of the fuser roll.

Fuser rolls having layers formed from compositions comprising polyfluorocarbon elastomers and/or fluorocarbon resins are disclosed in, for example, U.S. Pat. Nos. 4,568,275; 5,253,027; 5,599,631; 4,853,737; 5,582,917; and 5,547,759, the disclosures of which are incorporated herein by reference. U.S. Pat. No. 5,595,823, the disclosure of which is incorporated herein by reference, discloses toner fusing members which have a substrate coated with a fluorocarbon random copolymer containing aluminum oxide. Although these toner fusing members have proved effective and have desirable thermal conductivity, they have a problem in that there can be toner contamination. The advantage of using the cured fluorocarbon thermoplastic random copolymer compositions is that they are effective for use with toner release agents that typically include silicone.

Polysiloxane elastomers have relatively high surface energy and relatively low mechanical strength, but are adequately flexible and elastic and can produce high quality fused images. After a period of use, however, the self-release property of the roll degrades, and offset begins to occur. Application of a polysiloxane fluid during roller use enhances the ability of the roller to release toner, but shortens roller life due to oil absorption. Oiled portions tend to swell and wear and degrade faster.

One type of material that has been widely employed in the past to form a resilient base cushion layer for fuser rolls is a condensation-crosslinked siloxane elastomer. Disclosure of filled condensation-cured poly(dimethylsiloxane) “PDMS' elastomers for fuser rolls can be found, for example, in U.S. Pat. Nos. 4,373,239; 4,430,406; and 4,518,655. A widely used siloxane elastomer is a condensation-crosslinked PDMS elastomer, which contains about 32–37 volume percent aluminum oxide filler and about 2–6 volume percent iron oxide filler, and is sold under the trade name, EC4952, by the Emerson Cumming Co., U.S.A. Despite some serious stability problems developing over time, materials such as EC4952 initially provide very suitable resilience, hardness, and thermal conductivity for fuser roll cushion layers.

A variety of materials have been employed in the overcoating of donor members included in fuser apparatus used in electrostatographic printing. U.S. Pat. No. 4,659,621 discloses a donor member having a surface layer comprising the crosslinked product of an addition curable vinyl terminated or vinyl pendant polyorganosiloxane, a finely divided filler, a silicon hydride crosslinking agent, and a crosslinking catalyst. U.S. Pat. No. 6,067,438 describes a donor member whose outermost layer comprises a polymeric composition containing a cured interpenetrating network of a fluorocarbon elastomer and a silicone elastomer, together with metal oxide. U.S. Pat. No. 6,190,771 describes a donor roller whose outer layer comprises a silicone material selected so that its swelling in 1000 cSt. polydimethylsiloxane is less than 6% by weight, the silicone material including a crosslinked polydialkylsiloxane incorporating an oxide, a crosslinked polydiarylsiloxane,or polyarylalkylsiloxane, a silicone T-resin, and a silane crosslinking agent. U.S. Pat. No. 6,075,966 discloses a release agent donor member whose outermost layer comprises a polymeric composition containing a cured interpenetrating network of fluorocarbon elastomer and one or more silicone resins. The disclosures of these patents are incorporated herein by reference.

SUMMARY OF THE INVENTION

The present invention is directed to an improved donor member for applying a toner release agent to a toned receiver. The donor member comprises a support, an intermediate layer disposed on the support, and an outermost layer formed from a cured composition comprising a fluorocarbon thermoplastic random copolymer, a curing agent, a particulate filler containing zinc oxide, and a curable aminosiloxane, wherein the fluorocarbon thermoplastic random copolymer has subunits of:

$$—(CH_2CF_2)x—,\ —(CF_2CF(CF_3)y—,\ \text{and } \mathbf{13}\ (CF_2CF_2)z—,$$

and x is from 1 to 40 or 60 to 80 mole percent, y is from 10 to 90 mole percent, z is from 10 to 90 mole percent, and x+y+z equals 100 mole percent.

The present invention is further directed to a fuser apparatus for electrostatographic printing comprising a fuser roll and a pressure roll forming a nip, a supply of offset preventing oil contained in a reservoir, and a donor roll for delivering the offset preventing oil to a receiver bearing a toner image, wherein the donor roll has an outermost layer formed from the described cured composition comprising a fluorocarbon thermoplastic random copolymer, a curing agent, a particulate filler containing zinc oxide, and a curable aminosiloxane. In a further embodiment, an outermost layer of the fuser roll of the described fuser apparatus is formed from the described cured composition.

DETAILED DESCRIPTION OF THE INVENTION

Figure 1:
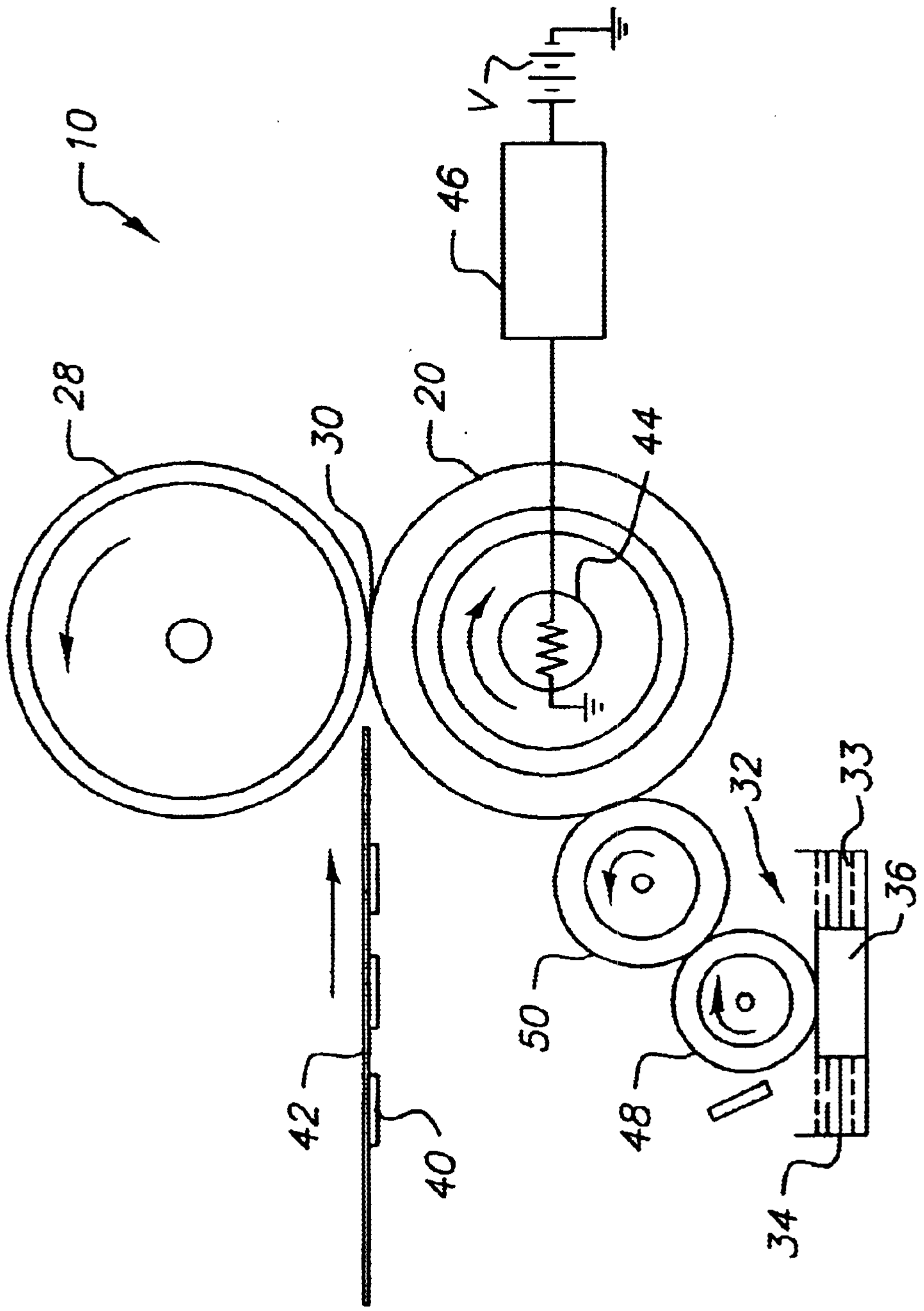
FIG. 1 is a schematic cross-sectional view of a fusing apparatus in accordance with the present invention.
Figure 2:
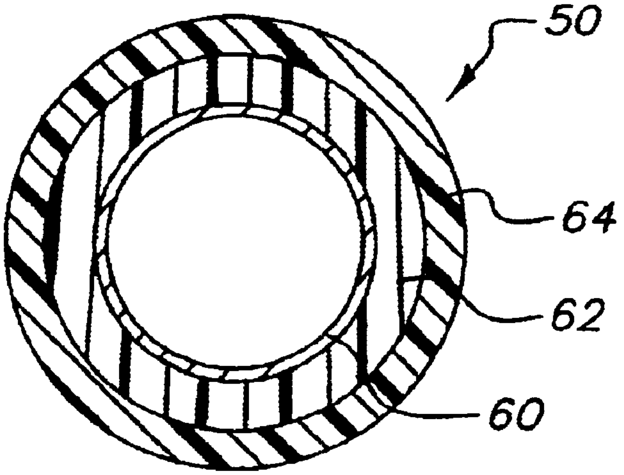
FIG. 2 is a cross-sectional view of a release agent donor member in accordance with the present invention.

FIG. 1 shows a cross sectional view of a fuser apparatus 10 that includes a donor member 50 of the present invention. FIG. 2 depicts a donor member comprising a release agent donor roll 50 that includes a support 60, an intermediate layer 62 that is conformable and disposed over support 60, and an outermost layer 64 disposed over intermediate layer 62. Suitable materials for constructing support 60 include, for example, aluminum, steel, various alloys, and polymeric materials such as thermoset resins, with or without fiber reinforcement. The support can be conversion coated and primed with metal alkoxide primer in accordance with U.S. Pat. No. 5,474,821, the disclosure of which is incorporated herein by reference.

The release agent donor roll 50 of the present invention, which is conformable with a fuser roll 20 and provides a substantially uniform release of release agent 33 across the surface of roll 20, may comprise a shaft with a solid or hollow cylinder having a diameter of about 8 mm to about 22 mm and a conformable surface layer having a thickness of about 3 mm to about 7 mm. Typically, the rolls are about 12 inches to about 18 inches in length.

The outermost layer 64 of donor member 50 includes a curing agent and a fluorocarbon random copolymer that is cured by the curing agent, the fluorocarbon random copolymer has subunits of:

—$(CH_2CF_2)$—(vinylidene fluoride subunit ("$VF_2$")),

—$(CF_2CF(CF_3)$—(hexafluoropropylene subunit ("HFP')), and

—$(CF_2CF_2)$—(tetrafluoroethylene subunit ("TFE"));

The layer further including a bisphenol residue curing agent, a particulate filler having zinc oxide, and a curable aminosiloxane that preferably is an amino-functionalized polydimethyl siloxane copolymer selected from the group consisting of (aminoethylaminopropyl)methyl, (aminopropyl)methyl, and (aminopropyl)dimethyl siloxanes.

Optionally, the layer may further contain a fluorinated resin selected from the group consisting of polytetrafluoroethylene and fluoroethylenepropylene having a number average molecular weight of between 50,000 and 50,000,000. The inclusion of such fluorinated resins in the donor member compositions in the presence of bisphenol residue curing agent significantly improves the frictional characteristics of the donor member.

In the formulas for the fluorocarbon random copolymer, x, y, and z are mole percentages of the individual subunits relative to a total of the three subunits (x+y+z), referred to herein as "subunit mole percentages" (The curing agent can be considered to provide an additional "cure-site subunit"; however, the contribution of these cure-site subunits is not considered in subunit mole percentages.) In the fluorocarbon thermoplastic copolymer, x has a subunit mole percentage of from 1 to 40 or 60 to 80 mole percent, y has a subunit mole percentage of from 10 to 90 mole percent, and z has a subunit mole percentage of from 10 to 90 mole percent. In a currently preferred embodiment of the invention, subunit mole percentages are: x is from 30 to 40 or 70 to 80, y is from 10 to 60, and z is from 5 to 30; or more preferably x is from 35 to 40, y is from 40 to 58, and z is 5 to 10. In the currently preferred embodiments of the invention, x, y, and z are selected such that fluorine atoms represent at least 75 percent of the total formula weight of the $VF_2$, HFP, and TFE subunits.

Preferably, a curable amino-functional polydimethylsiloxane copolymer is used in the present invention and is cured concurrently with the fluorocarbon thermoplastic random copolymer to produce a material suitable for forming the outermost layer of the donor member, use as the toner release layer of a fusing member. Preferred curable amino-functional polydimethylsiloxanes are bis(aminopropyl) terminated polydimethylsiloxanes. Such oligomers are available in a series of molecular weights as disclosed, for example, by Yilgor et al, "Segmented Organosiloxane Copolymer", *Polymer,* 1984, vol.25, pp1800–1806.

A preferred class of curable amino-functional polydimethylsiloxanes, based on availability, includes those having functional groups such as aminopropyl or aminoethylaminopropyl pendant from the siloxane backbone such as DMS-A11, DMS-A12, DMS-A15, DMS-A21 and DMS-A32, sold by Gelest, Inc., having a number-average molecular weight between about 850 to 27,000. Other curable amino-functional polydimethylsiloxanes that can be used are disclosed in U.S. Pat. Nos. 4,853,737 and 5,157,445, the disclosures of which are incorporated herein by reference.

Preferred composites of the invention have a ratio of aminosiloxane polymer to fluorocarbon thermoplastic random copolymer between about 0.01 and 0.2 to 1 by weight, preferably between about 0.05 and 0.15 to 1. The composite is preferably obtained by curing a mixture comprising from about 60–90 weight percent of a fluorocarbon thermoplastic copolymer, about 5–20 weight percent, preferably about 5–10 weight percent, of a curable amino-functional polydimethylsiloxane copolymer, about 1–5 weight percent of bisphenol residue curing agent, about 1–20 weight percent of an zinc oxide acid acceptor type filler, and about 10–50 weight percent of a fluorinated resin release aid filler.

Curing of the fluorocarbon thermoplastic random copolymer is carried out at much shorter curing cycles compared to the well known conditions for curing vinylidene fluoride based fluorocarbon elastomer copolymers. For example, the usual conditions for curing fluorocarbon elastomers are 12–48 hours at temperatures of 50° C. to 250° C. Typically, fluorocarbon elastomer coating compositions are dried until solvent-free at room temperature, then gradually heated to about 230° C. over 24 hours, and maintained at that temperature for 24 hours. By contrast, the fluorocarbon thermoplastic random copolymer compositions of the current invention are cured for 3 hours at a temperature of 220° C. to 280° C. and an additional 2 hours at a temperature of 250° C. to 270° C.

The outermost layer of the donor roll of the invention includes a particulate filler comprising zinc oxide. The zinc oxide particles can be obtained from a convenient commercial source, e.g., Atlantic Equipment Engineers of Bergenfield, N.J. In a currently preferred embodiment of the invention, the particulate zinc oxide filler has a total concentration in the outermost layer of from about 1 to about 20 parts per hundred parts by weight of the fluorocarbon thermoplastic random copolymer (pph). Concentrations of zinc oxide less than about 1 part by weight may not provide the desired degree of stability to the layer. Concentrations of zinc oxide greater than about 20 parts by weight may render the layer undesirable stiff. Preferably, the outermost layer contains about 3 to about 10 pph of zinc oxide.

The particle size of the zinc oxide filler does not appear to be critical. Particle sizes anywhere in the range of about 0.1 $\mu$m to about 100 $\mu$m, preferably about 1 $\mu$m to about 40 $\mu$m, have been found to be acceptable.

To form the outermost layer, the filler particles are mixed with the uncured fluorocarbon thermoplastic random copolymer, aminosiloxane, a bisphenol residue curing agent, and any other additives, such as fluorinated resin, shaped over the support, and cured. The fluorocarbon thermoplastic random copolymer is cured by crosslinking with basic nucleophile addition curing. Basic nucleophilic cure systems are well known and are discussed, for example, in U.S. Pat. No. 4,272,179, the disclosure of which is incorporated herein by reference. One example of such a cure system combines a bisphenol residue as the curing agent and an organophosphonium salt as an accelerator. Suitable fluorinated resins include polytetrafluoroethylene (PTFE) or fluoroethylenepropylene (FEP), which are commercially available from duPont.

The crosslinker is incorporated into the polymer as a cure-site subunit, for example, bisphenol residues. Other examples of nucleophilic addition cure systems are sold commercially by duPont as DIAK No. 1 (hexamethylenediamine carbamate) and DIAK No. 3 (N,N'-dicinnamylidene-1,6-hexanediamine).

Suitable fluorocarbon thermoplastic random copolymers are available commercially. In a particular embodiment of the invention, a vinylidene fluoride-co-tetrafluoroethylene co-hexafluoropropylene, which can be represented as —(VF)(75)—(TFE)(10)—(HFP)(25)—, was employed. This material is marketed by Hoechst Company under the designation 'THV Fluoroplastics" and is referred to herein as "THV". In another embodiment of the invention, a vinylidene fluoride-co-tetrafluoroethylene-co-hexafluoropropylene, which can be represented as —(VF)(42)—(TFE)(10)—(HFP)(58)—, was used. This material is marketed by Minnesota Mining and Manufacturing, St. Paul, Minn., under the designation "3M THV" and is referred to herein as "THV-200". Other suitable uncured vinylidene fluoride-cohexafluoropropylenes and vinylidene fluoride-co-tetrafluoroethylene-cohexafluoropropylenes are available, for example, THV-400, THV-500 and THV-300.

In general, THV Fluoroplastics are set apart from other melt-processable fluoroplastics by a combination of high flexibility and low process temperature. With flexural modulus values between 83 Mpa and 207 Mpa, THV Fluoroplastics are the most flexible of the fluoroplastics.

The molecular weight of the uncured polymer is largely a matter of convenience; however, an excessively large or excessively small molecular weight would create problems, the nature of which are well known to those skilled in the art. In a preferred embodiment of the invention the uncured polymer has a number average molecular weight in the range of about 100,000 to 200,000.

The donor member is constructed forming an outermost layer on an intermediate layer disposed on a support, as follows:

(a) providing a support coated with an intermediate layer;

(b) providing a mixture having:

(i) a fluorocarbon thermoplastics random copolymer having subunits of:

$$—(CH_2CF_2)x—, —(CF_2CF(CF_3)y—, \text{and } —(CF_2CF_2)z—,$$

wherein x is from 1 to 40 or 60 to 80 mole percent, y is from 10 to 90 mole percent, z is from 10 to 90 mole percent, x+y+z equals 100 mole percent;

(ii) a filler comprising zinc oxide;

(iii) a curable amino-functional polydimethylsiloxane copolymer comprising amino-functional units selected from the group consisting of (aminoethylaminopropyl)methyl, (aminopropyl) methyl and aminopropyl)dimethyl.

(iv) a bisphenol residue curing agent; and (c) applying the mixture to the intermediate layer, and curing the applied mixture to crosslink the fluorocarbon thermoplastic random copolymer.

A release agent such as a PDMS oil is beneficially employed in a fusing apparatus to prevent offset, that is, to aid the fuser member in releasing from the toner it contacts during the fusing operation. During use, the oil is continuously coated over the surface of the fuser roll in contact with the toner image. Release agent oils, including polydimethylsiloxane, amino-functionalized polydimethylsiloxane or mercapto-functionalized polydimethylsiloxane, can be applied at rates from about 0.5 mg/copy to about 10 mg/copy, where a copy is an 8.5x11-inch sheet of 20 pound bond paper.

The outermost layer of the donor member of the invention is substantially resistant to release oil induced swelling. In a preferred embodiment of the invention, the change in size due to swelling is less than 0.1 to 1.0 percent. In an even more preferred embodiment of the invention, the change in size due to swelling is less than 0.01 to 0.1 percent.

The thickness of the intermediate and outermost layers and the composition of the intermediate layer can be chosen so that the intermediate layer can provide the desired resilience to the donor member, and the outermost layer can flex to conform to that resilience. The thickness of the intermediate and outermost layers are chosen with consideration of the requirements of the particular application intended. Usually, the outermost layer would be thinner than the intermediate layer. For example, intermediate layer thicknesses in the range from about 0.5 mm to about 7.5 mm have been found to be appropriate for various applications. In some embodiments of the present invention, the intermediate layer is about 0.6 mm thick, and the outermost layer is about 25 $\mu$m to about 30 $\mu$m thick.

Suitable materials for the intermediate layer include any of a wide variety of materials previously used for base cushion layers of fuser members, such as the condensation cured polydimethylsiloxane marketed as EC4952 by Emerson Cumming. Preferably, however, the intermediate layer of a donor member of the present invention comprises a "soft" addition-cured, crosslinked polyorganosiloxane. A particularly preferred composition for the intermediate layer includes the following:

(a) a crosslinkable poly(dialkylsiloxane) incorporating an oxide, wherein the poly(dialkylsiloxane) has a weight-average molecular weight before crosslinking of about 1,000 to about 90,000;

(b) optionally, one or more crosslinkable polysiloxanes selected from the group consisting of a poly (diarylsiloxane), a poly(arylalkylsiloxane), and mixtures thereof;

(c) about 1 to about 5 parts by weight per hundred parts of polysiloxane of finely divided filler; and (d) a crosslinking catalyst.

In accordance with the present invention, the intermediate layer of the release agent donor roll comprises the crosslinked product of a mixture of at least one polyorganosiloxane having the formula $$A—[Si(CH_3)R^1O]_n[Si(CH_3)R^2O]_m—D$$

where $R^1$ and $R^2$ are each independently selected from the group consisting hydrogen, unsubstituted alkyl, alkenyl, or aryl groups containing up to about 18 carbon atoms, and fluorosubstituted alkyl groups containing up to about 18 carbon atoms; A and D are each independently selected from the group consisting of hydrogen, a methyl group, a hydroxyl group, and a vinyl group; m and n are each integers defining the number of repeat units and each independently rages from 0 to about 10,000; a crosslinking agent; and a crosslinking catalyst.

Preferred commercially available material for forming the highly crosslinked polyorganosiloxane of the intermediate layer composition are GE 862 silicone rubber from General Electric Company, or S5100 from Emerson Cumming Silicones Division of W. R. Grace and Company.

In accordance with the present invention, the intermediate layer has a Shore A hardness value, as measured for 75-mil compression molded slabs of the sample coatings using a Shore A Durometer, preferably of about 30 to about 70, more preferably, about 30 to about 40.

The outermost layer of the donor roll of the present invention includes a silicone material selected so that its swelling in 350 cts amino-functionalized poly (dimethylsiloxane) is more than 15% by weight. In general, there are two methods for decreasing the swell caused by the polymeric release agent. The first is to add inert filler, which operates simply by displacing release agent, resulting in a reduced polymer to swell relationship. This approach has the disadvantage of the filler not providing a good releasing surface, which leads to greater contamination and offset. The second and preferred method is to control the swell characteristics of the base polymer of the outermost layer composition by adjusting properties such as crosslink density and compatibility of the base polymer with the polymeric release agent. The crosslink density is generally adjusted by the selection of the molecular weight of the component resins. The compatibility of the base polymer with the polymeric release agent can be controlled by changing the chemical structure of the release agent or by changing the composition of the fuser roll outermost layer, as described in U.S. Pat. No. 4,807,341.

The invention is further illustrated by the following examples and comparative examples:

Coating of Intermediate Layer on Cylindrical Support

A cylindrical aluminum core was cleaned with dichloromethane and dried. The core was then primed with a uniform coat of a metal alkoxide type primer, Dow 1200 RTV Prime Coat primer, marketed by Dow Corning Corporation of Midland Mich., then air dried. 100 parts RTV S5100A, a crosslinkable poly(dimethylsiloxane) incorporating an oxide filler, was blended with 100 parts S5100B curing agent, both components being available from Emerson Cumming Silicones Division of W. R. Grace and Company. The mixture was degassed and molded on the core to a dried thickness of 0.230 inch. The roll was then cured with a 0.5-hour ramp to 80° C., followed by a 1-hour hold at 80° C.

Cores coated with an intermediate layer as just described were used to prepare both the comparative donor roll and the donor roll of the present invention.

Preparation of Comparative Donor Roll

A mixture of 100 parts VITON A fluoropolymer, available from duPont, and 40 parts SFR-100, available from General Electric Company, were mixed on a two-roll mill, then dissolved in methyl ethyl ketone to form a 25 weight percent solids solution. A portion of the resulting material was ring coated onto a core coated with an intermediate layer as previously described, air dried for 1 hour, baked with a 24-hour ramp to 230° C., then held 24 hours at 230° C. The resulting outermost layer containing an interpenetrating network (IPN) of separately crossliked polymers, had a thickness of 1 mil.

Preparation of Donor Roll of the Invention 100 parts fluorocarbon thermoplastic random copolymer THV 200A, 6 parts zinc oxide, and 14 parts of the curable aminosiloxane were mixed with 40 parts fluoroethylenepropylene (FEP). THV200A is a commercially available fluorocarbon thermoplastics random copolymer sold by 3M Corporation. The zinc oxide particles can be obtained from, for example, Atlantic Equipment Engineers, Bergenfield, N.J. The aminosiloxane DMS-A21 is commercially available from Gelest, Inc. The fluorinated resin fluoroethylenepropylene (FEP) is available from duPont.

The mixture prepared as just described was combined with 3 grams of curative 50, obtained from duPont, and mixed on a two-roll mill, then dissolved in methyl ethyl ketone to form a 25 weight percent solids solution. A portion of the resulting material was ring coated onto a core coated with an intermediate layer as previously described, air dried for 16 hours, baked with 2.5-hour ramp to 275° C., given a 30 minute soak at 275° C., then held 2 hours at 260° C. The resulting outermost layer containing fluorocarbon random copolymer had a thickness of 1 mil.

Measurement of Coefficient of Friction (COF)

In accordance with the present invention, the outermost layer of the donor roll has a kinetic coefficient of friction value of less than about 0.6 and a static coefficient value of less than about 0.8, as determined at room temperature.

COF measurements were carried out on a slip/peel SP-102C-3M90 unit from Instrumentors Inc. The COF value is calculated as follows:

Tractive Forces/Normal Forces=Meter Reading/Sled Weight

The test was carried out by placing a sheet of Hammermill Tidal DP long grain paper (8.5 inch×11 inch—10M-S20/50) on the test bed (the side opposite the recommended copy side of the paper was tested) and then securing a thin free standing elastomer film of interest to an aluminum sled with the dimensions of 38 mm×53 mm. The test bed with dimensions of 15.25 cm×30.50 cm, then traveled at a rate of 12 in/min. The unit digitally recorded a tractive force for the static and kinetic component of the measurement, which was then divided by the sled weight to produce the static and kinetic COF values. ASTM D1894 was used as a rough guide for carrying out the COF test.

COF measurements on samples of films formed from the outermost layer compositions, the comparison IPN and the fluorocarbon random copolymer of the present invention were carried out at room temperature, with the following results:

| Sample | Static COF | Kinetic COF |
|---|---|---|
| IPN | >1.000 | 0.914 |
| Fluorocarbon random copolymer | 0.575 | 0.462 |

U.S. Pat. Nos. 5,582,917 and 6,075,966, mentioned above, disclose, respectively, a fuser roll and a release agent donor roll each having a surface layer comprising a fluorocarbon-silicone interpenetrating network obtained by heating a fluorocarbon elastomer with a fluorocarbon elastomer curing agent in the presence of a curable polyfunctional poly($C_{1-6}$alkyl)siloxane polymer. Although the surface layer containing the interpenetrating network (IPN) imparts good toner release properties to a fuser roll, it suffers the disadvantages of a relatively high coefficient of friction and relatively low mechanical strength.

In the course of making many thousands of copies in an electrostatographic apparatus, a fuser roll having an IPN outer layer experiences wear, even at relatively low temperatures but especially at the elevated temperatures typically encountered. This wear, which is evidenced by a decrease in the gloss of a fuser roll surface, can result in a significant loss of copy quality. The toner release agent donor of the present invention substantailly alleviates the wear of a fuser member surface.

Figure 3:
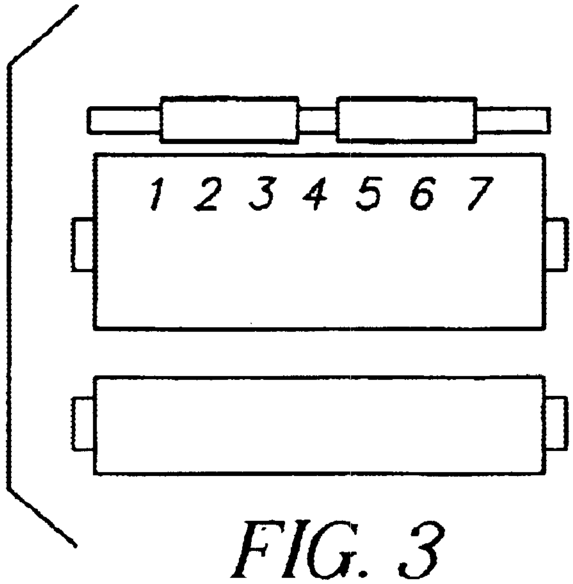
FIG. 3 is a schematic representation of the procedure and apparatus used to measure surface wear of a fuser roll as a function of donor roll surface layer.

To measure the surface wear of the fuser roll as a function of the donor roll surface layer, the procedure and apparatus schematically illustrated in FIG. 3 was employed. FIG. 3 depicts an apparatus having a three rollers in rotating contact, a pressure roller, a fuser roller having sectors 1, 2, . . . 7 designated along its length, and a donor roller whose surface is cut away so that it is in contact with the fuser roller only at sectors 2, 3, 5, and 6 and is not in contact with the fuser roller at sectors 1, 4, and 7. The pressure roller had a 200-mil thick intermediate layer and a 1-mil thick topcoat on a 3.5-inch diameter core, the fuser roller had a 200-mil thick intermediate layer and a 1-mil thick topcoat on a 6.0-inch diameter core, and the donor roller had a 230-mil thick intermediate layer and a 1-mil thick topcoat on a 0.875-inch diameter core. The fuser roll rotated ate 12 in/sec, the donor roller at 11.5 in/sec.

Using the described apparatus, a series of wear tests, each equivalent to making 100,000 copies, were carried out without paper for 24 hours, with the fuser roll heated through a cycle of temperatures, 300°, 360°, 400° F. (149°, 182°, 204° C.), the temperatures being programmed to change from one setting to the next every two hours. The pressure roller used in all the tests had an outermost coating of fluorocarbon thermoplastic random copolymer (FLC). Two fuser rollers were employed, one with an IPN topcoat, the other with a fluorocarbon thermoplastic random copolymer (FLC) topcoat. Similarly, two release agent donor rollers, prepared as described above with IPN and FLC topcoats, were used.

At the conclusion of each test, three gloss measurements using a gloss meter set at 60° were made at each sector of the fuser roll and averaged. The averaged 60° gloss values for sectors 1, 4, and 7, where the donor roller was not in contact with the fuser roller, were combined and averaged. Similarly, the averaged 60° values for sectors 2, 3, 5, and 6, where the donor roller was in contact with the fuser roller, were combined and averaged. By subtracting the second of these averaged values from the first, one can determine the reduction in the 60° gloss of the fuser roller surface, which is an indicator of the wear of the fuser roller attributable to its contact with the donor roller over the course of the test. The entries in the following table demonstrate the effect of the donor roller topcoat on fuser wear, as measured by the reduction of fuser roller surface gloss resulting from the described test.

| Test | Donor Roll Topcoat | Fuser Roll Topcoat | Initial 60° Gloss | Change in 60° Gloss | Percentage Change |
|---|---|---|---|---|---|
| 1 (Comp.) | IPN | IPN | 24 | −19 | −78 |
| 2 (Invention) | FLC | IPN | 16 | −9.1 | −38 |
| 3 (Comp.) | IPN | FLC | 16 | −4.5 | −29 |
| 4 (Invention) | FLC | FLC | 16 | −1.1 | −7 |

In Comparison Test 1, in which both the donor and fuser rollers had an IPN topcoat, a 78% loss in the 60° gloss of the fuser roller surface was observed, indicative of substantial wear. In Test 2, when the donor roller used in Comparison Test 1 was replaced with a donor roll of the invention comprising a fluorocarbon thermoplastic random copolymer (FLC) topcoat, substantially diminished fuser wear, as evidenced by a reduction in the gloss value to 38%, as compared to 78%.

Comparison Test 3, in which the IPN-topcoated donor roller of Comparison Test 1 was retained but was used together with an FLC-topcoated fuser roller, the reduction in gloss value was 29%, demonstrating the improved wear characteristics of an FLC topcoat on a fuser roller compared with an IPN topcoat.

In Test 4, in which both the donor and fuser rollers had an FLC topcoat, a loss in the 60° gloss of the fuser roller surface of only 7% was observed. This excellent result demonstrate the very substantial advantage of providing, in accordance with the present invention, both the release agent donor roller and the fuser roller with an outermost layer comprising a fluorocarbon thermoplastic random copolymer (FLC).

The invention has been described in detail with particular reference to certain preferred embodiments thereof, but it should be appreciated that variations and modifications can be effected within the scope of the invention, which is defined by the following claims.

What is claimed is:

1. A donor member for applying a toner release agent to a toned receiver, said donor member comprising:

a support, an intermediate layer disposed on the support, and an outermost layer formed from a cured composition comprising a fluorocarbon thermoplastic random copolymer, a curing agent, a particulate filler containing zinc oxide, and a curable aminosiloxane, said fluorocarbon thermoplastic random copolymer having subunits of:

$$—(CH_2CF_2)x—, —(CF_2CF(CF_3)y—, \text{ and } —(CF_2CF_2)z—,$$

wherein x is from 1 to 40 or 60 to 80 mole percent, y is from 10 to 90 mole percent, z is from 10 to 90 mole percent, and x+y+z equals 100 mole percent.

2. The donor member of claim 1 wherein the curable aminosiloxane is an amino-functional polydimethylsiloxane copolymer.

3. The donor member of claim 2 wherein the amino-functional polydimethylsiloxane copolymer comprises amino functional units selected from the group consisting of (aminoethylaminopropyl)methyl, (aminopropyl)methyl, and (aminopropyl)dimethyl.

4. The donor member of claim 1 wherein the curable aminosiloxane has a total concentration in the layer of from about 1 to about 20 parts by weight per 100 parts of the fluorocarbon thermoplastic random copolymer.

5. The donor member of claim 4 wherein the curable aminosiloxane has a total concentration in the layer of from about 5 to about 15 parts by weight per 100 parts of the fluorocarbon thermoplastic random copolymer.

6. The donor member of claim 1 wherein the zinc oxide has a total concentration in the layer of from about 1 to about 20 parts by weight per 100 parts of the fluorocarbon thermoplastic random copolymer.

7. The donor member of claim 6 wherein zinc oxide has a total concentration in the layer of from 3 to 15 parts by weight per 100 parts of the fluorocarbon thermoplastic random copolymer.

8. The donor member of claim 1 wherein said curing agent comprises bisphenol residues.

9. The donor member of claim 1 wherein the fluorocarbon thermoplastic random copolymer is nucleophilic addition cured.

10. The donor member of claim 1 wherein x is from 60 to 80 mole percent, y is from 10 to 90 mole percent, and z is from 10 to 90 mole percent.

11. The donor member of claim 10 wherein x is from 60 to 75 mole percent and y is from 14 to 58 mole percent.

12. The donor member of claim 1 wherein z is greater than 40 mole percent.

13. The donor member of claim 1 wherein the fluorocarbon thermoplastic random copolymer further comprises a fluorinated resin.

14. The donor member of claim 13 wherein the fluorinated resin has a number average molecular weight between 50,000 and 50,000,000.

15. The donor member of claim 13 wherein the ratio of fluorocarbon thermoplastic random copolymer to fluorinated resin is between 1:1 and 50:1.

16. The donor member of claim 13 wherein the fluorinated resin is polytetrafluoroethylene or fluoroethylenepropylene.

17. The donor member of claim 1 wherein the outermost layer has a kinetic coefficient of friction value of less than about 0.6, as determined at room temperature.

18. The donor member of claim 1 wherein the outermost layer has a static coefficient of friction value of less than about 0.8, as determined at room temperature.

19. The donor member of claim 1 wherein the intermediate layer comprises a composition of:

(a) a crosslinkable poly(dialkylsiloxane) incorporating an oxide, wherein the poly(dialkylsiloxane) has a weight-average molecular weight before crosslinking of about 1,000 to about 90,000;

(b) optionally, one or more crosslinkable polysiloxanes selected from the group consisting of a poly (diarylsiloxane), a poly(arylalkylsiloxane), and mixtures thereof;

(c) about 1 to about 5 parts by weight per hundred parts of polysiloxane of finely divided filler; and (d) a crosslinking catalyst.

20. The donor member of claim 1 wherein the intermediate layer comprises the crosslinked product of a mixture of at least one polyorganosiloxane having the formula $$A—[Si(CH_3)R^1O]_n[Si(CH_3)R^2O]_m—D$$

where $R^1$ and $R^2$ are each independently selected from the group consisting hydrogen, unsubstituted alkyl, alkenyl, or aryl groups containing up to about 18 carbon atoms, and fluorosubstituted alkyl groups containing up to about 18 carbon atoms; A and D are each independently selected from the group consisting of hydrogen, a methyl group, a hydroxyl group, and a vinyl group; m and n are each integers defining the number of repeat units and each independently rages from 0 to about 10,000; a crosslinking agent; and a crosslinking catalyst.

21. The donor member of claim 1 wherein the intermediate layer has a Shore A hardness of about 30 to about 70.

22. The donor member of claim 21 wherein the intermediate layer has a Shore A hardness of about 30 to about 40.

23. The donor member of claim 1 wherein the support is cylindrically shaped.

24. A fuser apparatus for electrostatographic printing comprising a fuser roll and a pressure roll forming a nip, a supply of offset preventing oil contained in a reservoir, and a donor roll for delivering the offset preventing oil to a receiver bearing a toner image, said donor roll comprising:

a support, an intermediate layer disposed on the support, and an outermost layer formed from a cured composition comprising a fluorocarbon thermoplastic random copolymer, a curing agent, a particulate filler containing zinc oxide, and a curable aminosiloxane, said fluorocarbon thermoplastic random copolymer having subunits of:

$$—(CH_2CF_2)x—, —(CF_2CF(CF_3)y—, \text{ and } —(CF_2CF_2)z—,$$

wherein x is from 1 to 40 or 60 to 80 mole percent, y is from 10 to 90 mole percent, z is from 10 to 90 mole percent, and x+y+z equals 100 mole percent.

25. The fuser apparatus of claim 24 wherein the curable aminosiloxane is an amino-functional polydimethylsiloxane copolymer.

26. The fuser apparatus of claim 25 wherein the amino-functional polydimethylsiloxane copolymer comprises amino functional units selected from the group consisting of (aminoethylaminopropyl)methyl, (aminopropyl)methyl, and (aminopropyl)dimethyl.

27. The fuser apparatus of claim 24 wherein the curable aminosiloxane has a total concentration in the layer of from about 1 to about 20 parts by weight per 100 parts of the fluorocarbon thermoplastic random copolymer.

28. The fuser apparatus of claim 24 wherein the zinc oxide has a total concentration in the layer of from about 1 to about 20 parts by weight per 100 parts of the fluorocarbon thermoplastic random copolymer.

29. The fuser apparatus of claim 24 wherein x is from 60 to 80 mole percent, y is from 10 to 90 mole percent, and z is from 10 to 90 mole percent.

30. The fuser apparatus of claim 24 wherein z is greater than 40 mole percent.

31. The fuser apparatus of claim 24 wherein the fluorocarbon thermoplastic random copolymer further comprises a fluorinated resin.

32. The fuser apparatus of claim 24 wherein said fuser roll comprises:

a support, an intermediate layer disposed on the support, and an outermost layer formed from a cured composition comprising a fluorocarbon thermoplastic random copolymer, a curing agent, a particulate filler containing zinc oxide, and a curable aminosiloxane, said fluorocarbon thermoplastic random copolymer having subunits of:

$$—(CH_2CF_2)x—, —(CF_2CF(CF_3)y—, \text{ and } —(CF_2CF_2)z—,$$

wherein x is from 1 to 40 or 60 to 80 mole percent, y is from 10 to 90 mole percent, z is from 10 to 90 mole percent, and x+y+z equals 100 mole percent.

33. The fuser apparatus of claim 24 further comprising a metering roll disposed between said oil reservoir and said donor roll.

* * * * *